US006836043B2

(12) United States Patent
Boss et al.

(10) Patent No.: US 6,836,043 B2
(45) Date of Patent: Dec. 28, 2004

(54) ENGINE WITH A SUPERCONDUCTIVE WINDING ARRANGED IN A WINDING SUPPORT AND MEANS FOR TRANSMITTING TORQUE FROM THE WINDING SUPPORT TO A SHAFT PART

(75) Inventors: Markus Boss, Muhr (DE); Michael Frank, Uttenreuth (DE); Adolf Kühn, Röthenbach (DE); Peter Massek, Forchheim (DE); Wolfgang Nick, Nürnberg (DE); Peter van Hasselt, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/469,955

(22) PCT Filed: Feb. 22, 2002

(86) PCT No.: PCT/DE02/00667

§ 371 (c)(1),
(2), (4) Date: Sep. 8, 2003

(87) PCT Pub. No.: WO02/071584

PCT Pub. Date: Sep. 12, 2002

(65) Prior Publication Data

US 2004/0075349 A1 Apr. 22, 2004

(30) Foreign Application Priority Data

Mar. 6, 2001 (DE) ........................................ 101 10 674

(51) Int. Cl.[7] ................................................. H02K 9/00
(52) U.S. Cl. ........................... 310/91; 310/261; 310/64
(58) Field of Search ............................... 310/52, 64–65, 310/91, 179, 195, 260, 264, 265, 261, 270

(56) References Cited

U.S. PATENT DOCUMENTS

| 3,657,580 A | * | 4/1972 | Doyle | 310/52 |
| 3,816,780 A | * | 6/1974 | Smith et al. | 310/52 |
| 3,999,091 A | * | 12/1976 | Kirtley et al. | 310/52 |
| 4,017,755 A | * | 4/1977 | Litz | 310/40 R |
| 4,239,999 A | | 12/1980 | Vinokurov et al. | 29/598 |
| 5,030,863 A | * | 7/1991 | Yoshimura et al. | 310/52 |
| 5,880,547 A | | 3/1999 | Shoykhet | 310/91 |
| 6,129,477 A | | 10/2000 | Shoykhet | 403/267 |

FOREIGN PATENT DOCUMENTS

| DE | 27 53 461 | 6/1978 |
| WO | WO 98/02953 | 1/1998 |

* cited by examiner

Primary Examiner—Tran Nguyen
(74) Attorney, Agent, or Firm—Staas & Halsey LLP

(57) ABSTRACT

The engine has a rotor rotationally mounted about a rotational axis and is provided with a superconductive winding arranged in a winding support. In order to fix the winding support inside an external rotor housing, a rigid connecting device having a hollow cylindrical connecting element made of fiber reinforced plastic is provided on the torque transmitting side. The connecting element is configured as a single piece and consist of end parts located on the front face and a central part located between the latter, wherein the end parts are corrugated in peripheral direction and are non-corrugated in the central part. The end parts of the connecting element are connected to and engine with one another in a non-positive fit manner in groovelike recesses of flangelike end pieces made of metal.

17 Claims, 3 Drawing Sheets

ENGINE WITH A SUPERCONDUCTIVE WINDING ARRANGED IN A WINDING SUPPORT AND MEANS FOR TRANSMITTING TORQUE FROM THE WINDING SUPPORT TO A SHAFT PART

CROSS REFERENCE TO RELATED APPLICATIONS

This application is based on and hereby claims priority to PCT Application No. PCT/DE02/00667 filed on 22 Feb. 2002 and German Application No. 101 10 674.2 filed on 6 Mar. 2001, the contents of which are hereby incorporated by reference.

BACKGROUND OF THE INVENTION

This invention relates to a machine having a rotor which is mounted such that it can rotate about a rotation axis and has an outer rotor housing attached to axial rotor shaft parts and encloses a winding former with a superconducting winding. The rotor also has a device to hold the winding former within the rotor outer housing, which device comprises a rigid connecting device, on a torque-transmitting side, between the winding former and the associated rotor shaft part with at least one torque-transmitting, hollow-cylindrical connecting element composed of plastic reinforced with fiber material. Furthermore, units are provided for cooling and thermal insulation of the superconducting winding. A corresponding machine is disclosed in U.S. Pat. No. 5,880,547.

Electrical machines, in particular generators or motors, generally have a rotating field winding and a stationary stator winding. In this case, the current density and hence the specific power of the machine, that is to say the power per kilogram of its own weight, can be increased, and the efficiency of the machine can also be increased by the use of cryogenic conductors, in particular superconducting conductors.

Cryogenic windings for electrical machines generally have to be thermally insulated from the environment and have to be kept at the necessary low temperature by a coolant. Effective thermal insulation can, in this case, be achieved only if the cryogenic parts of the machine are as far as possible separated from the warm outer area by a hard vacuum with a residual gas pressure of generally less than $10^{-3}$ mbar, and if connecting parts between these cryogenic parts and the warm outer area transmit as little heat as possible.

Two variants in particular are known for vacuum insulation of rotors with cryogenic rotor windings and warm stator windings: in a first embodiment, the rotor has a warm outer housing and a closed vacuum area which rotates with it. The vacuum area should in this case surround the cryogenic area on all sides (see, for example, "Siemens Research and Development Reports", Volume 5, 1976, No. 1, pages 10 to 16). However, heat is transmitted in an undesirable manner to the cryogenic parts via supports which extend through the vacuum area. In a second embodiment, the essentially cold rotor rotates in a hard vacuum. In this case, the outer boundary of the hard vacuum area is defined by the inner bore in the stator. However, an arrangement such as this requires shaft seals which are proof against a hard vacuum between the rotor and the stator (see, for example, DE 27 53 461 A).

The machine which is disclosed in the initially cited U.S. patent document uses the first-mentioned embodiment. The superconducting winding of its rotor is located in the interior of a rotor cystostat which, together with flanged shafts that are fitted, forms an outer housing of the rotor. Helium cooling is provided for the superconductors of the winding. In contrast, the outer contour of the rotor outer housing is at approximately room temperature, and even possibly above room temperature during operation. The useful torque from the machine is produced in the rotor winding. The rotor winding is arranged in a cold winding former which is itself suspended or held in an insulated manner in the rotor outer housing, which acts as the cryostat. In this case, this suspension or retention on the drive side of the rotor, which is frequently referred to as the A side of the machine, must be sufficiently robust to transmit the torque from the cold winding former to a shaft part on the drive side. A corresponding rigid connecting device must therefore be designed to be relatively solid in order to transmit torque, and must be connected to the winding former and to the drive-side shaft part such that power can be transmitted. This leads to heat unavoidably being introduced into the cold area of the rotor. The connecting device is therefore frequently cooled separately (see, for example, "Handbook of Applied Superconductivity", Vol. 2: Ed.: B. Seeber, Institute of Physics Publishing, Bristol (GB), 1998, pages 1497 to 1499 and 1522 to 1530).

At the same time, this connecting device also provides the drive-side centering for the cold winding former. On the opposite rotor side, which is also referred to as the non-drive side or in general also as the B side, because important connections for operation of the machine, such as a coolant supply, are provided in it, virtually no torque is emitted. Only the functions of centering and thermal insulation therefore need be provided here. Furthermore, measures must be provided to compensate for the shrinkage of the cooled-down winding former.

In order to reduce the amount of heat introduced into the cooled superconducting area of the rotor, one specific embodiment of the known machine provides for the torque-transmitting connecting device to have, at least on the drive side, a hollow-cylindrical connecting element composed of a glass-fiber-reinforced plastic. This hollow cylinder is provided in each of its two axial ends with a coupling element made of steel, which is connected to the winding former and to the drive shaft such that power can be transmitted. The mechanical connection between the hollow cylinder composed of plastic and the coupling elements composed of steel must ensure a high degree of resistance to overloading and fatigue strength in response to alternating loads since considerably greater torques than during normal operation occur on motors such as these, for example during starting and in the event of various defects, and these must not cause any damage to the connecting device. However, the U.S. patent document contains no details relating to the connection between the hollow cylinder and the coupling elements.

In addition to metallic superconductor materials such as NbTi or $Nb_3Sn$ which have been known for a long time and are used in the machines mentioned above, metal-oxide superconductor materials with critical temperatures above 77 K have been known since 1987 as well. Attempts have been made using conductors made of such high-$T_c$ superconductor materials, which are also referred to HTS materials, to produce superconducting windings for machines (see, for example, WO98/02953). Owing to the temperature differences between the operating temperature of the superconductor material and the outside temperature in the warmer rotor outer housing, even machines with this type of conductor require measures to reduce the temperature which is introduced into the superconducting area.

SUMMARY OF THE INVENTION

One possible object of the present invention is to specify a suitable connecting device for torque transmission for a machine having the features mentioned initially, which device allows a connection which transmits power and ensures high fatigue strength and a high overload capacity in a relatively simple manner between the cold winding former and the associated warm rotor shaft part, and which in the process limits conductive heat losses to the cold winding former.

The inventors propose a connecting element composed integrally of end-face end parts with a center part located in between them, the end parts should have a corrugated shape seen in the circumferential direction, while the center part should not be corrugated, the connecting element should be connected on the end parts to flange-like end pieces composed of metal such that power can be transmitted when they engage in one another, with a) the end parts projecting completely and the center part in each case projecting to a certain extent into groove-like recesses in the respective flange-like end piece,
b) at least one side wall of each recess having a corrugated shape which is matched to the corrugated shape of the respective end part,
c) the corrugated shape of each end part resting at least partially on the corrugated shape of the side wall of the corresponding recess, and
d) those parts of the connecting element which are arranged in the recesses being fixed by at least partial filling of the remaining areas of the recesses.

Furthermore, the flange-like end pieces in the machine should be connected in a power-transmitting manner to an associated part of the winding former and/or to a side part, which is connected to the rotor shaft part, of the rotor outer housing.

The advantages associated with this refinement of the machine are that the particular refinement of the hollow-cylindrical connecting element results in good power transmission between the poorly thermally conducting part of the hollow-cylindrical connecting element and the metal parts of the winding former, at least in the area of its end-face end parts. This improvement occurs because of the corresponding configuration of the flange-like end pieces in the connecting area with these end parts. In this case, problems with the shear strength, in particular with respect to overloading and during continuous operation, are advantageously avoided in the connecting area between the plastic and the metal, which otherwise represents a weak point for torque transmission, in that the torque is now primarily transmitted by compression and less by shear in the groove-like cutouts. In order to improve the power transmission, the connecting element may be adhesively bonded to the flange-like end pieces. In this case, the end parts are effectively wedged into the groove-like recesses in the respective flange-like end piece by the filling. This is because the corresponding wedges composed of the filling material, such as a plastic which can be cured, at least largely fill the intermediate spaces between the corrugated end parts and the side walls of the groove-like recesses. A wedging process such as this not only prevents the connecting element from sliding out of the recesses, but also improves the power transmission by compression forces instead of shear forces in the "metal-plastic" connecting area.

Particularly uniform distribution of the forces when torque is being transmitted can be ensured by corrugation on at least one side wall of each cutout and the interlock with the respective correspondingly corrugated end part, seen in the circumferential direction. Since, in addition, the uncorrugated center part (which is in the form of a smooth hollow cylinder) of the connecting element likewise projects to a certain extent into each of the cutouts, where it is fixed and thus connected to the respective metal end piece such that power can be transmitted. This avoids particular loads in the transitional area between the corrugated end part and the uncorrugated center part. The uncorrugated configuration of the center part also advantageously helps to reduce the risk of this part bulging.

It can thus be regarded as advantageous to provide the end parts with a corrugated shape that is distributed uniformly over the circumference. In this case, the corrugated shape may be sinusoidal. Such a refinement of the end parts and hence of at least one side wall of the respectively associated groove-like recess makes it possible to ensure that power is uniformly transmitted between these parts.

It is also particularly advantageous for at least the majority (that is to say more than half) of the fibers of the fiber material to extend without any interruption over each transitional area between the respective end part and the center part of the connecting element. This is because fibers which pass through these areas contribute to these intrinsically critical areas being able to transmit a high power load. Known fiber materials, in particular glass fibers or carbon fibers, may be used as the fibers.

In order to improve the power transmission and to ensure good torque transmission between the flange-like end pieces and the winding former, or the drive-side rotor shaft part, the end pieces are each advantageously provided with an end-face tooth system which engages in a corresponding tooth system of the respective mating piece. The tooth system may intrinsically be designed to be self-locking. Appropriate tooth systems are known per se.

Either metallic low-$T_c$ superconductor material or, in particular, metal-oxide high-$T_c$ superconductor material may be used for the conductors of the superconducting winding. The use of metal-oxide high-$T_c$ superconductor material makes the cooling process easier.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
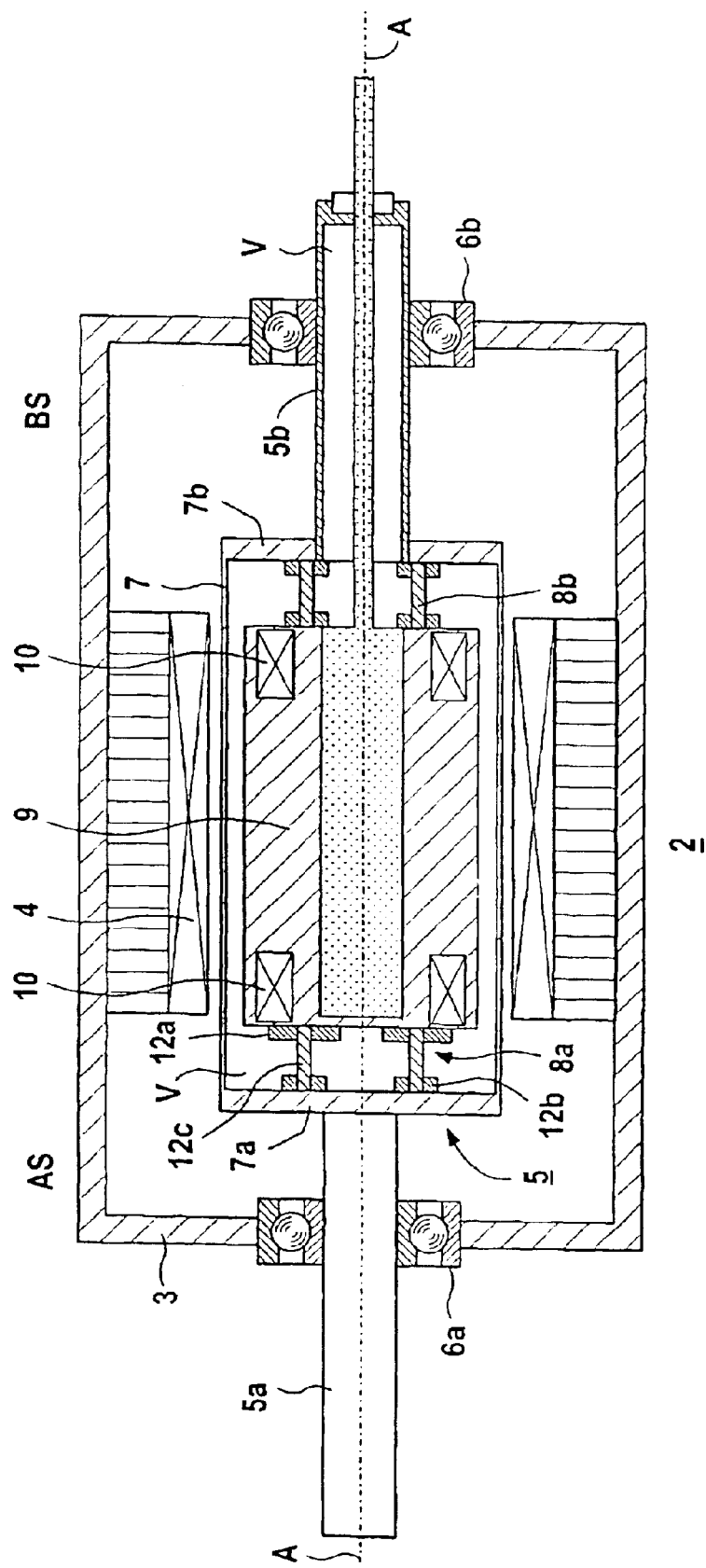
FIG. 1 shows one possible embodiment of the machine, in the form of a longitudinal section.

Reference will now be made in detail to the preferred embodiments, examples of which are illustrated in the accompanying drawings, wherein like reference numerals refer to like elements throughout.

Corresponding parts in the figures are provided with the same reference symbols.

The embodiment of the machine as described in the following text may in particular be a synchronous motor or a generator. Other fields of application or use for corresponding machines are, of course, also possible, for example for high rotation speeds, compact drives, for ships or for so-called offshore facilities such as drilling platforms. The machine has a rotating superconducting winding which in principle allows the use of metallic LTS material (low-$T_c$ superconductor material) or, in particular, oxide HTS material (high-$T_c$ superconductor material). The latter material is assumed to have been chosen for the following exemplary embodiment. The winding may comprise a coil or a system of coils in an arrangement with 2, 4 or some other number of poles. The basic design of a synchronous machine such as this is shown in FIG. 1, based on the assumption of known embodiments of such machines (see, for example, the related art as cited above).

Figure 2:
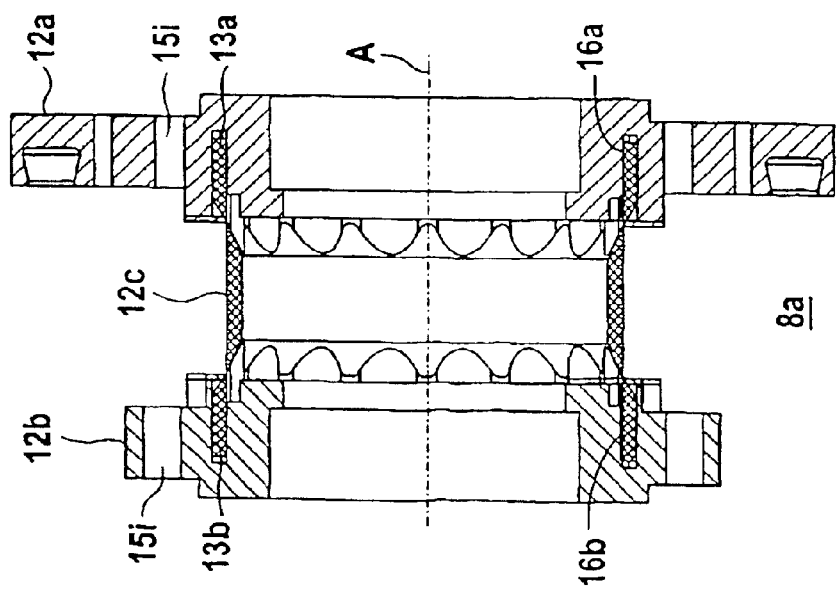
FIG. 2 shows a specific refinement of a connecting device for this machine, in the form of a longitudinal section.

The machine 2 comprises a stationary machine outer housing 3 which is at room temperature and has a stator winding 4. A rotor 5 is mounted in bearings 6a and 6b within this outer housing and surrounded by the stator winding 4, such that it can rotate about a rotation axis A. For this purpose, the rotor has an outer rotor housing 7 which is in the form of a vacuum vessel and holds a winding former 9 with an HTS winding 10. On each of its axially opposite (end) faces, this outer rotor housing has a side part 7a or 7b in the form of a disk or annular disk. Each of these side parts is connected rigidly to a solid axial rotor shaft part 5a or 5b, with each rotor shaft part having an associated bearing 6a or 6b, respectively. A rigid tubular connecting device 8a is provided on the so-called drive side AS of the outer rotor housing 7 between the winding former 9 and the side part 7a of the outer rotor housing. Side part 7a is in the form of a disk and is firmly connected to the rotor shaft part 5a. Torque is also transmitted via the rigid connecting device 8a, which has flange-like end pieces 12a and 12b at the ends and with a connecting element 12c running in between them (see FIG. 2). The connecting device advantageously essentially comprises a poorly thermally conductive hollow cylinder composed of a plastic material reinforced with fibers such as glass fibers (so-called "GFC" material). In this way, the fibers are laid in a manner known per se in the plastic material which is used as a matrix for them and is selected on the basis of its strength. The fibers in this case advantageously run obliquely in the plastic material with respect to the rotation axis A, that is to say not parallel or at right angles to it. If required, they may also be located in different layers, in which case their angle with respect to the axis may also differ. The composite material formed in this way ensures sufficiently high mechanical stiffness for torque transmission and a high thrust modulus (G modulus) while having low thermal conductivity. Further details of the connecting device are illustrated in FIG. 2. As can also be seen from FIG. 1, a further connecting device 8b is arranged on the non-drive side, which is the opposite side to the drive side AS and is referred to in the following text as BS, between the winding former 9 and the side part 7b of the outer rotor housing 7 which is in the form of a disk. A coolant supply, inter alia, for cooling the superconducting winding 10 is provided from outside the machine on this side BS via the hollow-cylindrical shaft part 5b. Details of the coolant supply and of the sealing are known. The figure therefore does not provide a detailed illustration. A vacuum which surrounds the winding former 9 with the superconducting winding 10 is annotated V. The vacuum is formed in particular between the warm rotor outer housing 7 and the winding former 9. Further known measures for thermal insulation, such as superinsulation, are not shown in the illustration.

GFC parts are advantageously used to reduce the amount of heat which is introduced from the warm side parts 7a and 7b (which are at room temperature) of the outer rotor housing into the cold part of the winding form 9, which is at low temperature, and hence into the cold winding 10. One specific embodiment of a connecting device 8a on the drive side AS is shown in the form of the longitudinal section in FIG. 2. The connecting device 8b on the non-drive side BS may have corresponding features. It should also be designed to allow axial compensation for expansion resulting from shrinkage of cooled-down rotor parts.

The essentially hollow-cylindrical connecting device 8a which can be inserted between the winding former 9 and the side part 7a has, as is shown in FIG. 2, a flange-like end piece 12a and 12b at each of its two opposite axial ends, with a connecting element 12c extending between these end pieces. While the end pieces 12a and 12b are composed of a metallic material, such as steel or some other fatigue-resistant material which is suitable for use at low temperatures, the connecting element 12c is manufactured from GFC. Both of the axial end faces of a connecting element project with end parts 16a and 16b, which are shown in more detail in FIGS. 4 to 6, into corresponding recesses or grooves 13a and 13b, respectively, in the respectively associated end piece and are connected to this end piece there.

Figure 3:
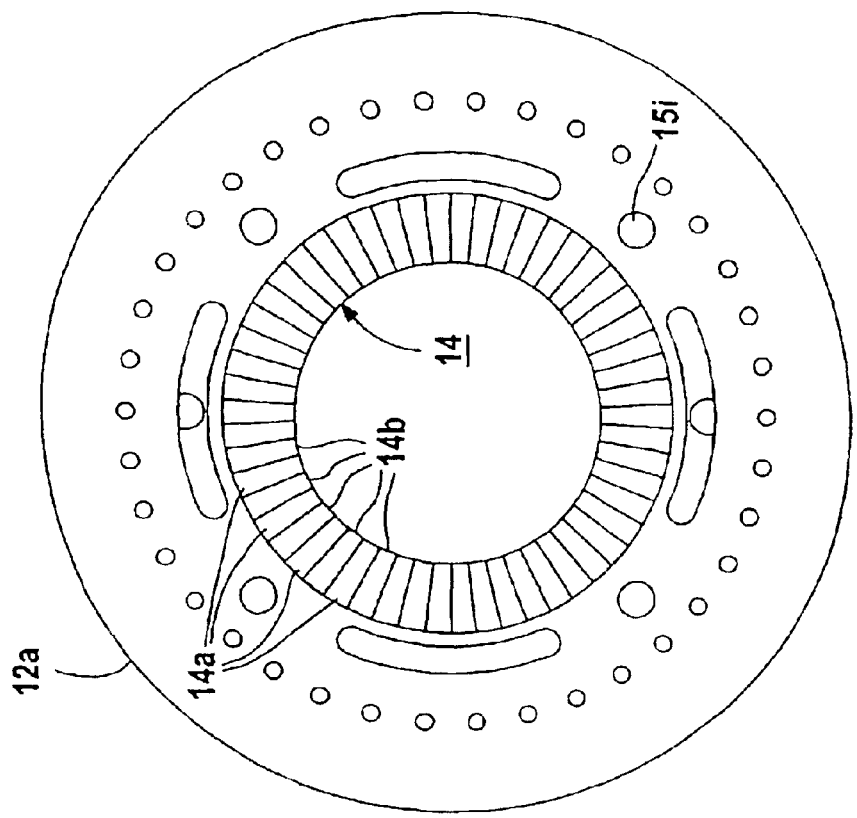
FIG. 3 shows a front view of a flange-like end piece of the connecting device shown in FIG. 2.

In order to transmit high torques between the flange-like end pieces 12a and 12b and the winding former 9, or the drive-side side part 7a, the respective flange-like end piece 12a or 12b is not just screwed to the respective winding former 9 or the side part 7a. FIGS. 2 and 3 show corresponding holes for screwing on the flange-like end pieces, which are generally annotated 15i. In fact, each end piece advantageously has an end-face tooth system 14, which can be seen in the side view in FIG. 3, with projecting teeth 14a and groove-like intermediate spaces 14b between them. The tooth system is designed in a manner known per se to produce a self-centering connection that can transmit power, in which case the torque can be passed on over a relatively large radius. The mating surface of the winding former 9 or of the side part 7a has a corresponding tooth system, where the teeth 14a in the tooth system 14 on the flange-like end piece 12a engage in corresponding grooves in the mating surface of the winding former.

In particular, it must also be possible to transmit high torques from the machine between the GFC connecting element 12c and the flange-like end pieces 12a and 12b. The measures are aimed at this purpose. Those end-face ends of the connecting element which project into the end pieces are specially designed for this purpose. As can be seen from the front view in FIG. 4, from the oblique view in FIG. 5 and from the longitudinal section view in FIG. 6, the hollow-cylindrical connecting element 12c has end parts 16a and 16b with a special design on both of its axial end faces. Rather than having the smooth (uncorrugated) annular form of a tubular center part 16c, these end parts are structured or formed in the circumferential direction such that they are provided with a regular corrugation, with projections 17j and depressions 18j, seen in the circumferential direction (see, in particular, FIG. 4). Such corrugation can preferably be applied during the production of the connecting element by appropriate forming while still in a deformable stage, with the fiber reinforcement advantageously not being damaged, so that the mechanical robustness of the composite material is maintained. The connecting element 12c is thus formed integrally with the center part 16c and its end-face end parts 16a and 16b. The corrugation of the end parts on which the figures are based is preferably sinusoidal and, in particular, is distributed uniformly over the entire circumference, for reasons associated with good torque transmission. If required, however, other corrugation shapes may also be provided and, furthermore, the circumference need be provided with corrugation only in individual areas.

The ends of the connecting element 12c together with its corrugated end parts are fitted into the annular, groove-like recesses 13a and 13b in the respective flange-like end piece. In order to ensure a good power-transmitting connection between the end pieces 12a and 12b and the connecting element 12c, each of the recesses in the end pieces has on its outer side wall, seen in the radial direction, and/or its opposite inner side wall, a corrugation which corresponds to the corrugation on the respective end part 16a or 16b. The respective end part is fitted in an interlocking manner to at least one of these walls. For this purpose, the remaining intermediate spaces between the side walls of the recesses and the corrugated end parts are filled with a filling composed of an adhesive material, preferably a plastic which can be cured. This results in wedge-like fillers for recesses which are corrugated on at least one side-wall.

The groove-like recesses should have a groove depth such that the end parts of the connecting element are completely accomodated, and a piece of the center part 16c also projects into each recess. To do this, the recess must, of course, have a width, which may be stepped, such that both the respective end part and a piece of the center part can be inserted into it. The piece of the inserted center part is likewise adhesively bonded there to the respective metallic end piece. This makes it possible to prevent particularly high loads in the transitional area from the corrugated end part to the uncorrugated center part. Effective torque transmission between the metallic end pieces 12a and 12b and the non-metallic connecting element 12c is thus ensured, without there being any risk of damage to the connecting areas between these parts when high torsion forces occur. Furthermore, this is a precautionary measure against the formation of cracks on the edges.

Figure 6:
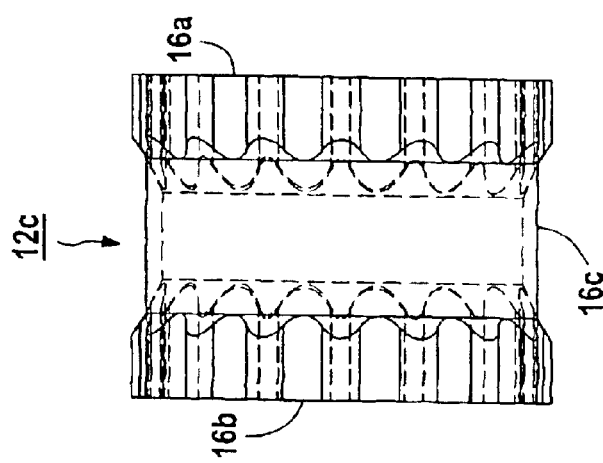
FIG. 6 shows a longitudinal section view of a connecting element for the connecting device shown in FIG. 2.
Figure 5:
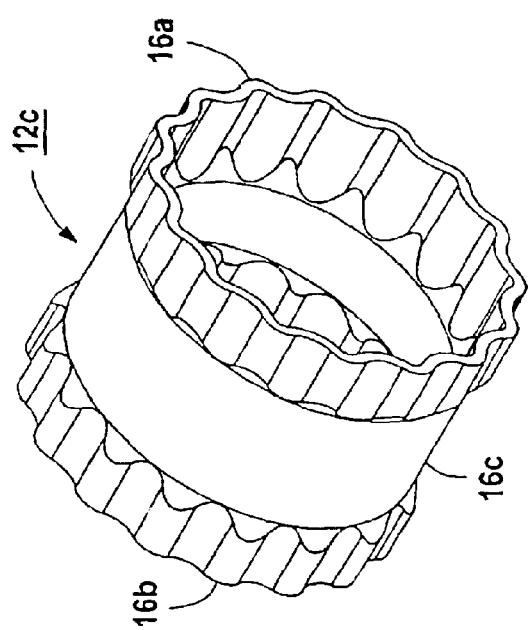
FIG. 5 shows an oblique view of a connecting element for the connecting device shown in FIG. 2.
Figure 4:
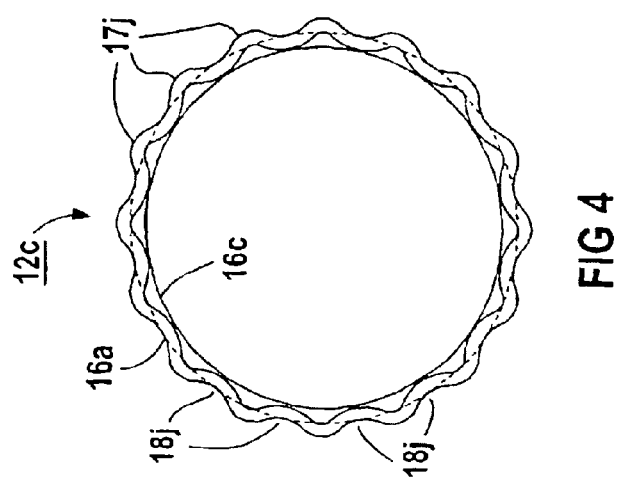
FIG. 4 shows a front view of a connecting element for the connecting device shown in FIG. 2.

Other refinements of the end parts of the connecting element and of the associated opening in the respective end piece are, of course, also possible to the extent that projections and depressions, which engage in one another and are distributed regularly in this direction when seen in the circumferential direction, on the parts to be connected prevent any respective twisting in the circumferential direction, and ensure the required torque transmission. These requirements can be satisfied in particular with the corrugation as shown in FIGS. 4 to 6. Special tooth systems, however, are also feasible.

The chosen exemplary embodiment is based on the assumption that a glass-fiber-reinforced plastic (GFC) is used for the connecting element 12c. It is, of course, also possible to use plastics reinforced with other fibers, such as carbon fibers, provided that these materials make it possible to ensure that the torque is transmitted, with little heat transmission at the same time.

Furthermore, instead of having a single hollow-cylindrical connection element, the connecting device may have two or more concentrically surrounding elements which, if necessary, also have their own flange-like concentrically surrounding end pieces.

The invention has been described in detail with particular reference to preferred embodiments thereof and examples, but it will be understood that variations and modifications can be effected within the spirit and scope of the invention.

What is claimed is:

1. A machine comprising:
   a rotor rotatably mounted on a rotor shaft to rotate about a rotation axis;
   an outer rotor housing having a torque-transmitting side and a torque-transmitting side part, wherein the side part is connected to the rotor shaft;
   a winding comprising a winding former and a superconducting winding, the winding former and the superconducting winding being enclosed by said outer rotor housing;
   a cooling and thermal insulation unit for the superconducting winding; and
   a rigid connecting device to hold the winding former within the outer rotor housing on the torque-transmitting side thereof, wherein said rigid connecting device is located between the winding former and the side part of the outer rotor housing, the rigid connecting device comprising:
      a connecting element that transmits torque, said connecting element being formed of a plastic reinforced with fiber material, the connecting element having a hollow, cylindrical shape, the connecting element comprising:
         two end-face end parts having a corrugated cross-sectional shape, and
         a center part located between, and formed integrally with, the end-face end parts, said center part having a cross-sectional shape that is not corrugated; and
      flange-like end pieces connected in a power-transmitting manner to the winding former or to the side part of the outer rotor housing, wherein the flange-like end pieces are formed of metal, said flange-like end pieces each having groove-like recesses to completely receive the end-face parts of the connecting element and to partially receive the center part of the connecting element, each of said recesses having at least one side wall corrugated to match the cross-sectional shape of the end-face end parts such that when the end face end parts are received in the recesses, there is a communication of corrugation and a space remaining in each recess that is unfilled with the end face part, wherein the connecting element is fixed in place in the recesses by at least partially filling the space remaining.

2. The machine as claimed in claim 1, wherein the end-face end parts have a uniform corrugated cross-sectional shape.

3. The machine as claimed in claim 1, wherein the end-face end parts have a sinusoidal corrugated cross-sectional shape.

4. The machine as claimed in claim 1, wherein each of the connecting elements is adhesively bonded into the groove-like recesses in the flange-like end pieces.

5. The machine as claimed in claim 1, wherein the flange-like end pieces are each provided with an end-face tooth system that engages in a corresponding tooth system on the winding former or on the side part of the outer rotor housing.

6. The machine as claimed in claim 5, wherein the tooth system is be self-centering.

7. The machine as claimed in claim 1, wherein the fiber material of the connecting element has fibers, and at least the majority of the fibers extend without any interruption over a transitional area between one of the end-face end parts and the center part.

8. The machine as claimed in claim 1, wherein the fiber material of the connecting element is formed of glass fibers or carbon fibers.

9. The machine as claimed in claim 1, wherein the flange-like end pieces are formed of a steel.

10. The machine as claimed in claim 1, wherein the superconducting winding has conductors which contain metallic low-$T_C$ superconductor material or metal-oxide high-$T_C$ superconductor material.

11. The machine as claimed in claim 1, wherein the winding former is surrounded by a vacuum.

12. The machine as claimed in claim 2, wherein the end-face end parts have a sinusoidal corrugated cross-sectional shape.

13. The machine as claimed in claim 12, wherein each of the connecting elements is adhesively bonded into the groove-like recesses in the flange-like end pieces.

14. The machine as claimed in claim 13, wherein the flange-like end pieces are each provided with an end-face tooth system that engages in a corresponding tooth system on the winding former or on the side part of the outer rotor housing.

15. The machine as claimed in claim 14, wherein the tooth system is be self-centering.

16. The machine as claimed in claim 15, wherein the fiber material of the connecting element has fibers, and at least the majority of the fibers extend without any interruption over a transitional area between one of the end-face end parts and the center part.

17. The machine as claimed in claim 16, wherein the fiber material of the connecting element is formed of glass fibers or carbon fibers.

* * * * *